(12) United States Patent
Hong et al.

(10) Patent No.: US 8,232,349 B2
(45) Date of Patent: Jul. 31, 2012

(54) TRANSPARENT THERMOPLASTIC RESIN AND METHOD FOR PREPARING THE SAME

(75) Inventors: Jae Keun Hong, Gunpo-Si (KR); Byeong Do Lee, Seo-Gu (KR); Young Sub Jin, Seoul (KR); Hwan Seok Park, Anyang-si (KR); Ho Ryong Sun, Yeosu-si (KR)

(73) Assignee: Cheil Industries Inc., Gumi-si (KR)

( * ) Notice: Subject to any disclaimer, the term of this patent is extended or adjusted under 35 U.S.C. 154(b) by 672 days.

(21) Appl. No.: 12/263,535

(22) Filed: Nov. 3, 2008

(65) Prior Publication Data
US 2009/0124750 A1 May 14, 2009

(30) Foreign Application Priority Data

Nov. 9, 2007 (KR) .................. 10-2007-0114387
Sep. 10, 2008 (KR) .................. 10-2008-0089251

(51) Int. Cl.
*C08L 25/02* (2006.01)
*C08L 25/12* (2006.01)
*C08L 25/14* (2006.01)
*C08L 33/10* (2006.01)
*C08L 53/02* (2006.01)

(52) U.S. Cl. ............. 525/93; 525/95; 525/96; 525/98

(58) Field of Classification Search .......... 525/93, 525/95, 96, 98
See application file for complete search history.

(56) References Cited

U.S. PATENT DOCUMENTS

| 4,097,555 | A | * | 6/1978 | Moran ............................ 525/84 |
| 4,113,798 | A | | 9/1978 | Moran |
| 4,126,600 | A | * | 11/1978 | Gergen et al. ................. 524/505 |
| 5,079,296 | A | | 1/1992 | Thompson et al. |
| 5,237,007 | A | | 8/1993 | Colella |
| 5,252,664 | A | | 10/1993 | Thompson et al. |
| 5,290,862 | A | | 3/1994 | Blasius |
| 5,344,878 | A | | 9/1994 | Colella et al. |
| 5,514,750 | A | * | 5/1996 | Cantrill et al. .................. 525/52 |
| 5,550,186 | A | * | 8/1996 | Cantrill et al. .................. 525/52 |
| 5,723,541 | A | * | 3/1998 | Ingenito et al. ............. 525/92 R |
| 6,734,247 | B2 | | 5/2004 | Donn et al. |
| 2002/0032282 | A1 | * | 3/2002 | Hsu ................................ 525/191 |

FOREIGN PATENT DOCUMENTS

| CN | 1834148 A | 9/2006 |
| JP | 06-345833 | 12/1994 |
| KR | 10-0726485 B1 | 6/2007 |

OTHER PUBLICATIONS

German Office Action in counterpart German Application No. 10 2008 056 659.4-43, dated Feb. 9, 2010.
English translation of German Office Action in counterpart German Application No. 10 2008 056 659.4-43, dated Mar. 17, 2010.

* cited by examiner

*Primary Examiner* — Jeffrey Mullis
(74) *Attorney, Agent, or Firm* — Summa, Additon & Ashe, P.A.

(57) ABSTRACT

Disclosed herein is a transparent thermoplastic resin comprising a rubber phase including an aromatic rubbery block copolymer resin, and a resin phase including a terpolymer comprising an aromatic vinyl compound, a vinyl cyanide compound and an unsaturated alkyl ester compound, wherein the rubber phase and the resin phase have a co-continuous phase structure.

9 Claims, 3 Drawing Sheets

Weight Change

Chemical Materials

TRANSPARENT THERMOPLASTIC RESIN AND METHOD FOR PREPARING THE SAME

CROSS-REFERENCE TO RELATED APPLICATIONS

This application claim priority from Korean Patent Application No. 10-2007-114387, filed Nov. 9, 2007 in the Korean Intellectual Property Office, and from Korean Patent Application No. 10-2008-89251, filed Sep. 10, 2008 in the Korean Intellectual Property Office, the disclosure of each of which is incorporated herein by reference in its entirety.

FIELD OF THE INVENTION

The present invention relates to a transparent thermoplastic resin and a method for preparing the same.

BACKGROUND OF THE INVENTION

Generally, resins used in applications that require transparency include mono-component materials having a single refractive index. However, the use of mono-component materials is limited in various complex applications. Recently, many attempts have been made to prepare materials having transparency while maintaining desirable inherent characteristics of various materials.

In particular, studies on materials having reinforced impact strength and rigidity have been undertaken by mixing a conjugated diene-based polymer resin and an acrylic or a styrene polymer resin. However, since the difference between refractive indices of the conjugated diene-based polymer resin and the acrylic or the styrene polymer resin are significantly large, there is a need for a transparent thermoplastic resin having the same high level of transparency as that of monopolymer to offset the difference between the refractive indices. Furthermore, it is still difficult to satisfy good transparency and improved properties such as impact strength, flowability, and chemical resistance.

In the case of preparing transparent ABS resin, various methods in which acrylic resins are copolymerized with an opaque ABS resin are known. For example, U.S. Pat. No. 4,113,798 is directed to a method for making a transparent ABS resin by melt-extruding a graft-ABS resin and a SAN resin prepared by using a batch process. However, since an excess amount of modifier is added to prepare an initial resin, the method of melt-extruding the graft-ABS resin and SAN resin prepared by using a batch process has a disadvantage in that a desirable color in the final product cannot be obtained, thereby limiting its application.

Another method for making a transparent ABS resin uses a single continuous process. This process, however, is limited by the limited rubbery polymers than can be used due to the equipment used to carry out the continuous process. The equipment also limits the use of additives such as lubricants, depending on the amount and types of additives used. Therefore, it is very difficult to obtain both good impact strength and flowability by this method. Furthermore, the method is not suitable for mass production.

To overcome the above problems, U.S. Pat. Nos. 5,079,296 and 5,252,664 disclose that transparency can be obtained by mixing a block copolymer having rubber property and a resin having good rigidity for imparting transparency, and adding a small amount of rubbery particles to increase insufficient impact strength. However, it is still difficult to obtain sufficient impact strength merely with block copolymers having conventional rubber property, and the rubbery particles can lower transparency.

U.S. Pat. Nos. 5,237,007, 5,290,862, 5,344,878, and 6,734,247 disclose that transparency as well as desirable mechanical properties can be obtained by using two different rubbery copolymers having different contents of rubber for improving impact strength and also by using a copolymer having good rigidity for reinforcing insufficient rigidity. However, these methods have a disadvantage in that heat resistance as well as chemical resistance decreases due to large contents of rubber.

SUMMARY OF THE INVENTION

The present invention is directed to a thermoplastic resin having good transparency, wherein the thermoplastic resin includes a rubber phase including an aromatic rubbery block copolymer resin and a resin phase including a terpolymer, as well as to methods of making the same. The terpolymer can have good chemical resistance to thereby impart good chemical resistance to the transparent thermoplastic resin. The transparent thermoplastic can further have good impact strength and flowability by controlling component, content, and molecular weight of the aromatic rubbery block copolymer resin and the terpolymer resin. Still further, the present invention can maximize the transparency of the transparent thermoplastic resin by matching the refractive indices (or stated differently by adjusting the difference in refractive indices) of the terpolymer resin and the aromatic rubbery block copolymer resin to provide a difference in refractive indices of about 0.008 or less. Other aspects, features and advantages of the present invention will be apparent from the ensuing disclosure and appended claims.

According to exemplary embodiments of the present invention, the transparent thermoplastic resin comprises a rubber phase including an aromatic rubbery block copolymer resin; and a resin phase including a terpolymer comprising an aromatic vinyl compound, a vinyl cyanide compound and an unsaturated alkyl ester compound, wherein the rubber phase and the resin phase have a co-continuous phase structure.

In some embodiments of the present invention, a part of the rubber phase and a part of the resin phase may form a discontinuous structure.

In some embodiments of the present invention, the thermoplastic resin may include the rubber phase in an amount of about 20 to about 80% by weight and the resin phase in an amount of about 20 to about 80% by weight.

The terpolymer may comprise about 50 to about 95% by weight of an aromatic vinyl compound, about 0.1 to about 30% by weight of a vinyl cyanide compound, and about 0.1 to about 45% by weight of an unsaturated alkyl ester compound.

The aromatic rubbery block copolymer resin may comprise about 10 to about 50% by weight of a rubbery polymer and about 50 to about 90% by weight of an aromatic vinyl compound.

The difference between refractive indices of the terpolymer and the aromatic rubbery block copolymer resin may be less than about 0.008.

In some embodiments of the present invention, a weight average molecular weight of the terpolymer may be about 140,000 to about 350,000.

The transparent thermoplastic resin may further comprise additives selected from the group consisting of flame retardants, antibiotic agents, releasing agents, thermal stabilizers, antioxidants, light stabilizers, compatibilizers, dyes, inorganic fillers, surfactants, nucleating agents, coupling agents, fillers, plasticizers, impact modifiers, admixing agents, coloring agents, stabilizers, lubricants, antistatic agents, pigments, flameproof agents, and combinations thereof.

In some embodiments of the present invention, the transparent thermoplastic resin may comprise about 20 to about 80% by weight of a terpolymer comprising (A) about 50 to about 95% by weight of an aromatic vinyl compound, about 0.1 to about 30% by weight of a vinyl cyanide compound and about 0.1 to about 45% by weight of an unsaturated alkyl ester compound; and (B) about 20 to about 80% by weight of an aromatic rubbery block copolymer resin comprising about 10 to about 50% by weight of a rubbery polymer and about 50 to about 90% by weight of an aromatic vinyl compound.

The resin may also have one or more of the following properties: Izod impact strength measured for 1/8" specimens at 23° C. in accordance with ASTM-D256 of about 10 kgf·cm/cm or more; melt flow rate (MFR) measured in accordance with ASTM D-1238 of about 45 g/10 minutes or more (220° C., 10 kg); haze of about 2.5 or less and transparency of about 88% or more, which are measured for 3 mm thick specimens using a Nippon Denshoku Haze meter; weight gain of about 10% or less and change in tensile strength of about 80% or less, which are measured in accordance with ASTM D-543 (immersion test) after a specimen is immerged in a methyl alcohol for 7 days; weight gain of about 5% or less and change in tensile strength of about 40% or less, which are measured in accordance with ASTM D-543 (immersion test) after a specimen is immerged in an ethyl alcohol for 7 days; and weight gain of about 15% or less and change in tensile strength of about 45% or less, which are measured in accordance with ASTM D-543 (immersion test) after a specimen is immerged in a gasoline for 7 days.

According to another aspect of the present invention, there is provided a method for preparing a transparent thermoplastic resin. The method comprises preparing an aromatic rubbery block copolymer resin having about 10 to about 50% by weight of rubbery polymer; preparing an aromatic vinyl-vinyl cyanide-unsaturated alkyl ester terpolymer having a weight average molecular weight of about 140,000 to about 350,000 by polymerizing an aromatic vinyl compound, a vinyl cyanide compound and an unsaturated alkyl ester compound to have a refractive index difference between the aromatic rubbery block copolymer resin and the terpolymer of about 0.008 or less; and mixing and melt-extruding the aromatic rubbery block copolymer resin and the aromatic vinyl-vinyl cyanide-unsaturated alkyl ester terpolymer.

In some embodiments of the present invention, about 20 to about 80% by weight of an aromatic rubbery block copolymer resin and about 20 to about 80% by weight of an aromatic vinyl-vinyl cyanide-unsaturated alkyl ester terpolymer may be mixed and melt-extruded through a conventional extruder.

The aromatic vinyl-vinyl cyanide-unsaturated alkyl ester terpolymer may be prepared by copolymerizing about 50 to about 95% by weight of an aromatic vinyl compound, about 0.1 to about 30% by weight of a vinyl cyanide compound, and about 0.1 to about 45% by weight of an unsaturated alkyl ester compound.

BRIEF DESCRIPTION OF THE DRAWINGS

FIGS. 4 (*a*), (*b*) and (*c*) are transmission electron microscope (TEM) images of a specimen prepared in Examples 4, 5, and 6;

FIGS. 5 (*a*), (*b*) and (*c*) are TEM images of specimens prepared in Comparative Examples 4, 5, and 6.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Aspects of the present invention provide a transparent thermoplastic resin. The transparent thermoplastic resin comprises a rubber phase and a resin phase, and the rubber phase and the resin phase have a substantially co-continuous phase structure.

In exemplary embodiments of the present invention, a part of the rubber and a part of the resin phase may form a discontinuous structure. Hereinafter, the term "co-continuous phase structure" means a structure in which the polymer phases form a continuous boundary (line) without forming an isolated domain of one of the polymer phases in the other of the polymer phases. Hereinafter, the term "discontinuous structure" means a structure in which one phase encloses the other phase so that an isolated domain can be formed therefrom.

Figure 1:
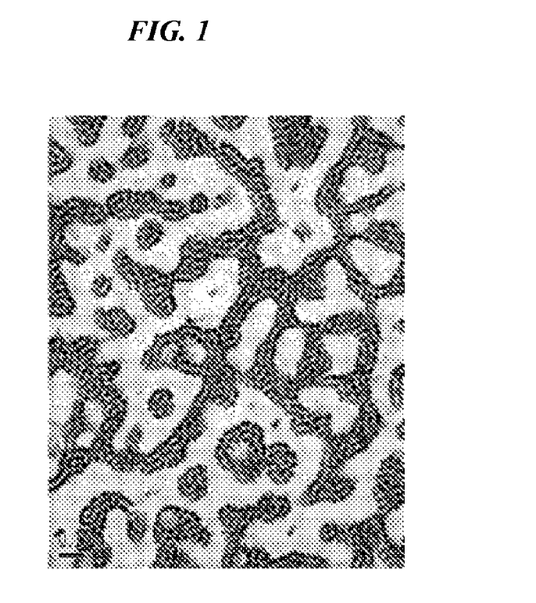
FIG. 1 illustrates a transparent thermoplastic resin forming a co-continuous structure according to an exemplary embodiment of the present invention.

FIG. 1 illustrates a transparent thermoplastic resin forming a co-continuous structure according to an exemplary embodiment of the present invention. The co-continuous structure may be identified by transmission electron microscope (TEM) images of specimens with a magnification of about 30,000. White parts represent a resin phase and black parts represent a rubber phase in FIG. 1. As shown in FIG. 1, the rubber phase and the resin phase have a co-continuous phase structure and at the same time it is determined that a part of the rubber and a part of the resin phase form a discontinuous structure. The rubber phase and the resin phase have amorphous and irregular structures In an exemplary embodiment of the invention, the rubber phase forms a continuous phase and the resin phase and some rubber phases may form a discontinuous structure. In another exemplary embodiment of the invention, the resin phase forms a continuous phase and the rubber and some resin phase may form a discontinuous structure.

The resin phase comprises a terpolymer comprising an aromatic vinyl compound, a vinyl cyanide compound and an unsaturated alkyl ester compound. The terpolymer may be prepared by polymerizing an aromatic vinyl compound, a vinyl cyanide compound and an unsaturated alkyl ester compound to impart good chemical resistance to the resin.

The rubber phase comprises an aromatic rubbery block copolymer resin.

In the present invention, the difference between refractive indices of the resin phase and the rubber phase is less than about 0.008, for example less than about 0.004, and as another example less than about 0.001.

In exemplary embodiments of the invention, the resin composition includes the rubber phase in an amount of about 20 to about 80% by weight, and the resin phase in an amount of about 20 to about 80% by weight. The terpolymer may be used in amount of about 35 to about 70% by weight. If the content of the terpolymer is less than about 20%, it may be difficult to obtain above a certain level of chemical resistance desired in the present invention, and if the content of the terpolymer is more than about 80%, it may be difficult to obtain above a certain level of impact resistance desired in the present invention.

In exemplary embodiments of the invention, the transparent thermoplastic resin of the present invention may comprise about 20 to about 80% by weight of a terpolymer comprising an aromatic vinyl compound, a vinyl cyanide compound and an unsaturated alkyl ester compound; and about 20 to about 80% by weight of an aromatic rubbery block copolymer resin.

Each component of the present invention will be described more fully hereinafter.

(A) Aromatic Vinyl-Vinyl Cyanide-Unsaturated Alkyl Ester Terpolymer

The terpolymer (A) of the present invention is prepared by polymerizing an aromatic vinyl compound, a vinyl cyanide compound and an unsaturated alkyl ester compound to impart good chemical resistance to the resin.

In an exemplary embodiment of the invention, the terpolymer (A) is prepared by copolymerizing about 50 to about 95% by weight of an aromatic vinyl compound, about 0.1 to about 30% by weight of a vinyl cyanide compound and about 0.1 to about 45% by weight of an unsaturated alkyl ester compound. In another exemplary embodiment of the invention, the terpolymer (A) is prepared by copolymerizing about 65 to about 85% by weight of an aromatic vinyl compound, about 2 to about 7% by weight of a vinyl cyanide compound and about 10 to about 30% by weight of an unsaturated alkyl ester compound.

A part of a hydrogen group of a vinyl structure or an aromatic structure in the aromatic vinyl compound may be substituted with a C1-C8 alkyl group. Examples of the aromatic vinyl compound may include, but are not limited to, styrene, C1-C8 alkyl substituted styrene such as α-methyl styrene, 2-methyl styrene, 3-methyl styrene, 4-methyl styrene, 2-ethyl styrene, 3-ethyl styrene, 4-ethyl styrene, 4-n-propyl styrene, 4-t-butyl styrene, and the like, vinyl naphthalene such as 1-vinyl naphthalene and 2-vinyl naphthalene, vinyl toluene, and the like. The aromatic vinyl compounds can be used alone or in combination with one another. Though the amounts of the aromatic vinyl compound are determined based on the refractive index of the aromatic rubbery block copolymer resin, the aromatic vinyl compound may be present in an amount of about 50 to about 95% by weight, based on 100% by weight of the terpolymer (A). If the terpolymer includes the aromatic vinyl compound in an amount less than about 50% by weight, or more than about 95%, it may be difficult to match the refractive index of an aromatic rubbery block copolymer resin to provide desired transparency.

The vinyl cyanide compound may be a material having both a copolymerizable unsaturated hydrocarbon and a cyanide substituent, and a part of a hydrogen group of an unsaturated structure may be substituted with a C1-C8 alkyl group. Examples of the vinyl cyanide compound may include, but are not limited to, acrylonitrile, methacrylonitrile, ethacrylonitrile, and the like. These vinyl cyanide compounds can be used alone or in combination with one another. The vinyl cyanide compound may be used in an amount of about 0.1 to about 30% by weight, based on 100% by weight of the terpolymer (A). If the amount of the vinyl cyanide compound is less than about 0.1% by weight, desirable chemical resistance may not be obtained, and if the amount of the vinyl cyanide compound is more than about 30% by weight, it may be difficult to match the refractive index of an aromatic rubbery block copolymer resin (B) to provide desired transparency.

The unsaturated alkyl ester compound may be a material having both a copolymerizable unsaturated hydrocarbon and an alkyl ester based substitute. An alkyl group of an alkyl ester based substitute may be in the form of a C1-C8 alkyl group or alkyl alcohol. Examples of the unsaturated alkyl ester compound may include, but are not limited to, methacrylic acid alkyl ester or C1-C12 alkyl substituted (meth)acrylate such as acrylic acid alkyl ester, methyl methacrylate, ethyl methacrylate, 2-ethylhexyl methacrylate, methyl acrylate, ethyl acrylate, butyl acrylate, 2-ethylhexylacrylate and the like. These can be used alone or in combination with one another. The unsaturated alkyl ester compound may be used in an amount of about 0.1 to about 45% by weight, based on 100% by weight of the terpolymer (A). If the amount of the unsaturated alkyl ester compound is more than about 45% by weight, it can be difficult to match the refractive index of an aromatic rubbery block copolymer resin (B) to provide desired transparency.

The amount of each component used in the terpolymer (A) of the present invention may be controlled by the refractive index of the rubber copolymer compound described below. When each component of compounds has a different optical refractive index, in order to acquire transparency, it is very important to closely match the refractive indices of copolymers as much as possible by adjusting the amounts of each of the components thereof.

According to the present invention, good transparency can be obtained using a terpolymer of aromatic vinyl compound-vinyl cyanide compound-unsaturated alkyl ester compound. The present inventors have surprisingly found that it is easier to offset the difference between refractive indices of an aromatic rubbery block copolymer and a resin using such a terpolymer instead of a conventional SAN resin. The difference between the refractive indices can be offset by controlling the composition of each component in the aromatic vinyl compound, the vinyl cyanide compound and the unsaturated alkyl ester terpolymer compound.

The difference between refractive indices of the terpolymer (A) of aromatic vinyl compound-vinyl cyanide compound-unsaturated alkyl ester compound and an aromatic rubbery block copolymer resin (B) may be adjusted to about 0.008 or less, for example about 0.004 or less, and as another example about 0.001 or less.

The terpolymer (A) may have a weight average molecular weight (Mw) of about 140,000 to about 350,000, for example about 200,000 to about 300,000. If the weight average molecular weight is less than about 140,000, good impact strength desired in the present invention may not be obtained, and if the weight average molecular weight is more than about 350,000, flowability can be lowered In the preparation of the terpolymer (A), conventional additives may be added in an amount of about 1% by weight per 100% by weight of the terpolymer having good chemical resistance to impart antioxidant property or to improve flowability, impact strength and other physical properties. The additives may include without limitation flame retardants, thermal stabilizers, antioxidants, light stabilizers, organic and inorganic pigments, dyes, inorganic fillers, and the like, and combinations thereof.

The terpolymer (A) having good chemical resistance may be prepared by any conventional polymerization method, and if needed, conventional methods of employing molecular weight control agents, modifying the condition of polymerization temperature, predicting the composition of copolymerization, and the like, can also be used.

The terpolymer (A) having good chemical resistance may be used in an amount of about 20 to about 80% by weight, for example about 35 to about 70% by weight, per total resin. If the amount of the terpolymer (A) is less than about 20% by weight, it may be difficult to obtain a certain level of chemical resistance desired in the present invention, and if the amount of the terpolymer (A) is more than about 80% by weight, it may be difficult to obtain impact strength desired in the present invention.

(B) Aromatic Rubbery Block Copolymer Resin

An aromatic rubbery block copolymer resin (B) of the present invention comprises about 10 to about 50% by weight of a rubbery polymer and about 50 to about 90% by weight of an aromatic vinyl compound. In some exemplary embodiments, the aromatic rubbery block copolymer resin comprises about 14 to about 40% by weight of a rubber component and about 60 to about 85% by weight of an aromatic vinyl compound The rubbery polymer may be a conjugated diene-based rubber and may have 4-12, for example 4-8, carbon atoms per molecule. Examples of the rubber component include without limitation 1,3-butadiene, isoprene, 2-methyl-1,3-butadiene, 2-ethyl-1,3-butadiene, 2,3-dimethyl-1,3-butadiene, 1,3-pentadiene, 3-butyl-1,3-octadiene, and the like, and combinations thereof.

The amount of the rubbery polymer employed in the aromatic rubbery block copolymer resin (B) can be about 10 to about 50% by weight, for example about 15 to about 35% by weight, per 100% by weight of the aromatic rubbery block copolymer resin. When the content of a rubbery polymer is about 10 to about 50% by weight, it may be possible to obtain good impact strength and transparency desired in the present invention.

Examples of the aromatic vinyl compound may include without limitation styrene, α-methyl styrene, 2-methyl styrene, 3-methyl styrene, 4-methyl styrene, 2-ethyl styrene, 3-ethyl styrene, 4-ethyl styrene, 4-n-propyl styrene, 4-t-butyl styrene, 1-vinyl naphthalene, 2-vinyl naphthalene, and the like, and these aromatic vinyl compounds can be used alone or in combination with one another.

The aromatic rubbery block copolymer resin (B) of the present invention may selectively include, if needed, monomers copolymerizable with the aromatic vinyl compound. Monomers copolymerizable with the aromatic vinyl compound may include without limitation vinyl cyanide compound, acrylic acid, methacrylic acid, maleic acid unhydride, N-substituted maleimide, and the like, and combinations thereof.

The aromatic rubbery block copolymer resin (B) may be prepared in the form of tapered (rubbery polymer-unsaturated monomer) copolymer, linear copolymer, di-block copolymer (unsaturated monomer-rubbery polymer) or tri-block copolymer (unsaturated momoner-rubbery polymer-unsaturated monomer), and combinations thereof.

The aromatic rubbery block copolymer resin (B) can be prepared by a conventional method such as living radical polymerization. The aromatic rubbery block copolymer resin (B) used in the present invention includes resins commercially available from Daelim H&L, Kumho Petrochemical, Chevron-Phillips, Kraton and AtoFina.

The aromatic rubbery block copolymer resin (B) may be used in an amount of from about 20 to about 80% by weight, for example about 40 to about 70% by weight. If the amount of the aromatic rubbery block copolymer resin is less than about 20% by weight, it can be difficult to obtain a certain level of impact resistance desired in the present invention, and if the amount of the aromatic rubbery block copolymer resin is more than about 80% by weight, it can be difficult to obtain good chemical resistance desired in the present invention.

For the transparent thermoplastic resin, Izod impact strength measured for ⅛" specimens at 23° C. in accordance with ASTM-D256 can be about 10 kgf·cm/cm or more; melt flow rate (MFR) measured in accordance with ASTM D-1238 can be about 45 g/10 minutes or more (220° C., 10 kg); haze measured for 3 mm thick specimens using a Nippon Denshoku Haze meter can be about 2.5 or less; transparency can be about 88% or more; weight gain can be about 10% or less and change in tensile strength can be about 80% or less, which are measured in accordance with ASTM D-543 (immersion test) after a specimen is immerged in a methyl alcohol for 7 days; weight gain can be about 5% or less and change in tensile strength can be about 40% or less, which are measured in accordance with ASTM D-543 (immersion test) after a specimen is immerged in a ethyl alcohol for 7 days; and weight gain can be about 15% or less and change in tensile strength can be about 45% or less, which are measured in accordance with ASTM D-543 (immersion test) after a specimen is immerged in a gasoline for 7 days.

In exemplary embodiments of the invention, for the transparent thermoplastic resin, Izod impact strength measured for ⅛" specimens at 23° C. in accordance with ASTM-D256 can be about 10 to about 50 kgf·cm/cm; melt flow rate (MFR) measured in accordance with ASTM D-1238 can be about 45 to about 65 g/10 minutes (220° C., 10 kg); haze measured for 3 mm thick specimens using a Nippon Denshoku Haze meter can be about 1.0 to about 2.3; transparency can be about 88 to about 95%; weight gain can be about 3 to about 10% and change in tensile strength can be about 20 to about 80%, which are measured in accordance with ASTM D-543 (immersion test) after a specimen is immerged in a methyl alcohol for 7 days; weight gain can be about 1 to about 5% and change in tensile strength can be about 15 about 40%, which are measured in accordance with ASTM D-543 (immersion test) after a specimen is immerged in a ethyl alcohol for 7 days; and weight gain can be about 5 to about 15% and change in tensile strength can be about 25 to about 43%, which are measured in accordance with ASTM D-543 (immersion test) after a specimen is immerged in a gasoline for 7 days.

According to another aspect of the present invention, there is provided a method for preparing a transparent thermoplastic resin. The method comprises melt-kneading (A) an aromatic vinyl-vinyl cyanide-unsaturated alkyl ester terpolymer and (B) an aromatic rubbery block copolymer resin.

In exemplary embodiments of the invention, the method comprises preparing an aromatic rubbery block copolymer resin having about 10 to about 50% by weight of a rubber component, preparing an aromatic vinyl-vinyl cyanide-unsaturated alkyl ester terpolymer having a weight average molecular weight of about 140,000 to about 350,000 by polymerizing an aromatic vinyl compound, a vinyl cyanide compound and an unsaturated alkyl ester compound to have a refractive index difference between the terpolymer and the aromatic rubbery block copolymer resin of about 0.008 or less, and mixing and melt-extruding the aromatic rubbery block copolymer resin and the aromatic vinyl-vinyl cyanide-unsaturated alkyl ester terpolymer.

In exemplary embodiments of the invention, about 20 to about 80% by weight of the aromatic rubbery block copolymer and about 20 to about 80% by weight of the aromatic vinyl-vinyl cyanide-unsaturated alkyl ester terpolymer may be mixed and melt-extruded.

The specific components and examples of applicable compounds of the aromatic rubbery block copolymer resin and the aromatic vinyl-vinyl cyanide-unsaturated alkyl ester terpolymer are same as those described above.

In the process of melt-extruding, conventional additives may be added. The additives may include without limitation flame retardants, antibiotic agents, releasing agents, thermal stabilizers, antioxidants, light stabilizers, compatibilizers, dyes, inorganic fillers, surfactants, nucleating agents, coupling agents, fillers, plasticizers, impact modifiers, admixing agents, coloring agents, stabilizers, lubricants, antistatic agents, pigments, flameproof agents, and combinations thereof.

The transparent thermoplastic resin having the above composition maintains high flowability and impact strength, and also exhibits good chemical resistance and transparency so that it is well suitable for molded articles such as exterior parts of electronic goods and precision parts for automobiles, toys, sanitary supplies, and the like, that may need transparency and chemical resistance in addition to good mechanical properties.

The invention may be better understood by reference to the following examples which are intended for the purpose of illustration and are not to be construed as in any way limiting the scope of the present invention, which is defined in the claims appended hereto.

EXAMPLES (A) Terpolymer Resin Having Good Chemical Resistance (a1) poly(methylmethacrylate-acrylonitrile-styrene monomer) copolymer having a weight average molecular weight of 203,000 (Mw) is used, which is prepared by a bulk continuous process with a polymerizing time of 4 hrs, and by adjusting the content of methylmethacrylate to 22.8% and the content of styrene monomer to 74.2% in order to obtain a refractive index of 1.5655 and acrylonitrile of 3% by weight.

(a2) poly(methylmethacrylate-acrylonitrile-styrene monomer) copolymer having a weight average molecular weight of 202,700 (Mw) is used, which is prepared by using a bulk continuous process with a polymerizing time of 4 hrs, and by adjusting the content of methylmethacrylate to 21.3% and the content of styrene monomer to 73.7% in order to obtain a refractive index of 1.5655 and acrylonitrile of 5% by weight.

(B) Aromatic Rubbery Block Copolymer Resin

Styrene-butadiene block copolymer resin (KK-38 grade), manufactured by Chevron-Phillips Co., having 30% by weight of butadiene and a refractive index of 1.5655 is used.

(C) Styrene-Based Copolymer Resin (c1) Polystyrene polymer prepared by a bulk continuous process with 4 hours of polymerizing time and having a weight average molecular weight of 212,000 g/mol and a refractive index of 1.590 is used.

(c2) poly(methylmethacrylate-styrene monomer) copolymer having a weight average molecular weight of 205,000 (Mw) and a refractive index of 1.5654 is used, which is prepared by a bulk continuous process with 4 hours of polymerizing time.

Examples 1-6

Components as shown in Table 1 are added to a conventional mixer, and the mixture is extruded through a twin screw extruder (L/D=29, φ=45 mm)=45 mm) at a temperature of 220° C. to prepare a product in pellet form. The pellets are then dried at 80° C. for 3 hours and molded into test specimens to evaluate the properties of the same using a 6-oz injection molding machine at 180-280° C. with a mold temperature of 40-80° C.

Comparative Examples 1-9

The components as shown in Table 1 are added to a conventional mixer, and the pellets and test specimens for properties are prepared by the same method as in the above Examples.

TABLE 1

|  |  | (A) Terpolymer | | (B) Rubbery block copolymer | (c1) Polystyrene | (c2) MMA-SMco-polymer |
|---|---|---|---|---|---|---|
|  |  | a1 | a2 |  |  |  |
| Examples | 1 | 50 | — | 50 | — | — |
|  | 2 | 55 | — | 45 | — | — |
|  | 3 | 60 | — | 40 | — | — |
|  | 4 | — | 50 | 50 | — | — |
|  | 5 | — | 55 | 45 | — | — |
|  | 6 | — | 60 | 40 | — | — |
| Comparative Examples | 1 | — | — | 50 | 50 | — |
|  | 2 | — | — | 45 | 55 | — |
|  | 3 | — | — | 40 | 60 | — |
|  | 4 | — | — | 50 | — | 50 |
|  | 5 | — | — | 45 | — | 55 |
|  | 6 | — | — | 40 | — | 60 |
|  | 7 | — | — | 100 | — | — |
|  | 8 | 100 | — | — | — | — |
|  | 9 | — | 100 | — | — | — |

(1) Izod Impact Strength: notch Izod impact strength is measured for ⅛" specimens (inch, kgf cm/cm) at 23° C. in accordance with ASTM D 256.

(2) Flowability (melt flow index: MFI): flowability is measured in accordance with ASTM D-1238 (g/10 min, 10 Kg, 220° C.).

(3) Haze: haze is measured for 3 mm thick test specimens using a Nippon Denshoku Haze meter (NDH 2000).

(4) Transparency: transparency is measured for 3 mm thick test specimens using a Nippon Denshoku Haze meter (NDH 2000).

The results of physical properties are shown in the following Table 2.

TABLE 2

|  |  | Izod (⅛") | MFI | HAZE | Transparency (%) |
|---|---|---|---|---|---|
| Examples | 1 | 17 | 57 | 2.1 | 89.6 |
|  | 2 | 14 | 53 | 2.1 | 89.7 |
|  | 3 | 10 | 48 | 2.0 | 89.9 |
|  | 4 | 19 | 56 | 2.0 | 89.8 |
|  | 5 | 14 | 51 | 2.1 | 89.4 |
|  | 6 | 11 | 47 | 2.0 | 89.9 |
| Comparative Examples | 1 | 7 | 63 | 10.2 | 69.8 |
|  | 2 | 5 | 58 | 9.6 | 72.3 |
|  | 3 | 2 | 52 | 8.3 | 73.5 |
|  | 4 | 10 | 48 | 3.2 | 81.0 |
|  | 5 | 7 | 46 | 2.9 | 82.0 |
|  | 6 | 4 | 38 | 2.8 | 81.4 |
|  | 7 | 68 | 79 | 2.7 | 87.3 |
|  | 8 | 2.1 | 24 | 1.5 | 84.2 |
|  | 9 | 2.0 | 25 | 1.4 | 93.8 |

As shown in Table 2, event though the same amounts of rubber copolymer resin are used, when terpolymer resin is used, materials which exhibit excellent impact strength, as compared to the examples not using the terpolymer, and which also show well balanced properties of impact strength/flowability can be prepared. In addition, excellent transparency can also be obtained by offsetting the difference between the refractive indices of different polymer resins used as components.

Test for Chemical Resistance

Figure 2:
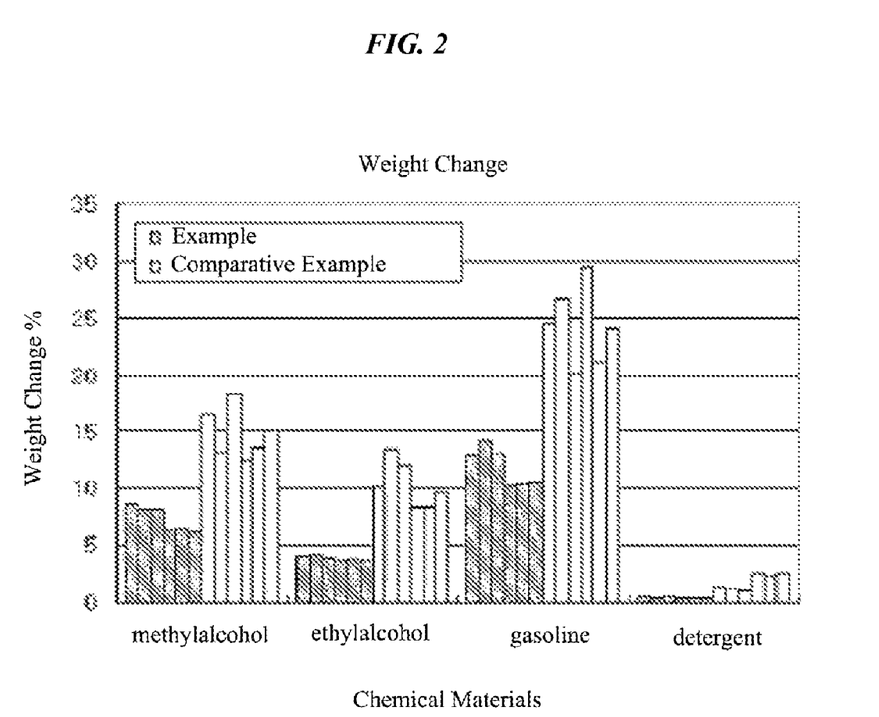
FIG. 2 is a graph illustrating a change of weight according to chemical reagents used in Examples 1-6 and Comparative Examples 1-6.
Figure 3:
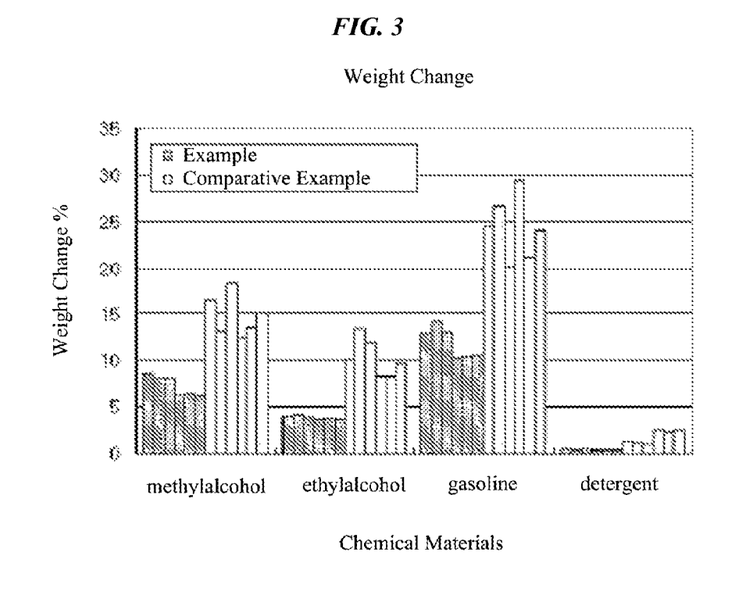
FIG. 3 is a graph illustrating a change in tensile strength according to chemical reagents used in Examples 1-6 and Comparative Examples 1-6.

Tests for chemical resistance in chemical reagents described in Table 3 are carried out with the test specimens prepared in Examples 1-6 and Comparative Examples 1-6. Distilled water, methyl alcohol (J. T. Baker, 99.9%), ethyl alcohol (J. T. Baker, 99.9%), gasoline (GS Caltex, "Kixx" unleaded gasoline), detergent (Aekyung, Trio) and olive oil (CJ, olive oil 100%) are used as the chemical reagents. The test specimens are immerged in the above chemical reagents for 7 days and then the weight gain and change in tensile strength are measured using ASTM D-543 (immersion test). The results of tests for chemical resistance are shown in the following Table 3, and related graphs are shown in FIGS. 2 and 3. FIG. 2 shows weight gains in the chemical reagents, and FIG. 3 shows change in tensile strength in the chemical reagents. In FIGS. 2 and 3, each bar according to the chemical reagents represents the results from Examples 1-6 and Comparative Examples 1-6 from the left in order.

Figure 6:
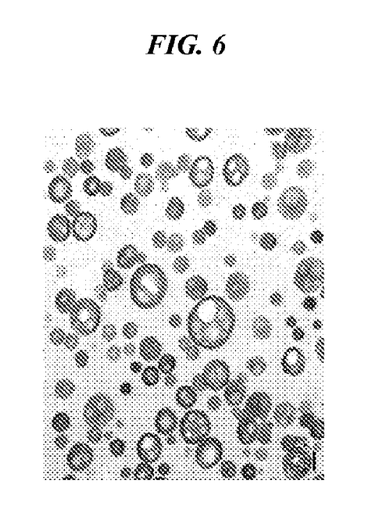
FIG. 6 is a TEM image of a transparent ABS resin.

FIG. 6 is a TEM image showing the surface of specimen prepared using the transparent ABS resin (product name: UT0100, Jeil industrial Co., Ltd. of Korea) with a magnification of 30,000. As shown in FIG. 6, a conventional transparent ABS resin does not have a co-continuous structure. Instead, the resin phase has a continuous phase structure and the rubber phase has a dispersed phase structure.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A transparent thermoplastic resin comprising:
a rubber phase including an aromatic rubbery block copolymer resin comprising about 10 to about 50% by weight of a rubbery polymer and about 50 to about 90% by weight of an aromatic vinyl compound; and

TABLE 3

| | | distilled water | | methylalcohol | | ethylalcohol | | gasoline | | detergent | | olive oil | |
|---|---|---|---|---|---|---|---|---|---|---|---|---|---|
| | | Weight Increase (%) | Change in Tensile Strength (%) | Weight Increase (%) | Change in Tensile Strength (%) | Weight Increase (%) | Change in Tensile Strength (%) | Weight Increase (%) | Change in Tensile Strength (%) | Weight Increase (%) | Change in Tensile Strength (%) | Weight Increase (%) | Change in Tensile Strength (%) |
| Examples | 1 | 0.43 | 1.6 | 8.47 | 76 | 4.04 | 33.1 | 12.87 | 41.4 | 0.50 | 0.7 | 0.27 | 0.4 |
| | 2 | 0.42 | 1.8 | 8.21 | 79 | 4.14 | 35.5 | 14.12 | 39.9 | 0.43 | 0.7 | 0.11 | 0.4 |
| | 3 | 0.35 | 1.4 | 8.11 | 77.3 | 3.89 | 30.5 | 13.10 | 35.7 | 0.55 | 0.9 | 0.24 | 0.6 |
| | 4 | 0.41 | 0.6 | 6.25 | 65.9 | 3.61 | 28.8 | 10.25 | 37.9 | 0.37 | 0.5 | 0.27 | 0.5 |
| | 5 | 0.41 | 0.6 | 6.44 | 36.8 | 3.72 | 26.7 | 10.36 | 38.5 | 0.40 | 0.6 | 0.31 | 0.4 |
| | 6 | 0.39 | 0.7 | 6.16 | 66.2 | 3.64 | 26.5 | 10.6 | 34.5 | 0.33 | 0.5 | 0.41 | 1.1 |
| Comparative Examples | 1 | 0.32 | 0.3 | 16.52 | 85.5 | 10.21 | 41.6 | 24.5 | 89.1 | 1.21 | 10.5 | 0.35 | 0.8 |
| | 2 | 0.41 | 0.7 | 13.23 | 83.8 | 13.47 | 57.5 | 26.72 | 91.8 | 1.13 | 10.8 | 0.45 | 0.7 |
| | 3 | 0.43 | 1.4 | 18.48 | 81 | 11.94 | 67.4 | 20.24 | 88.3 | 1.01 | 4.7 | 0.43 | 1.4 |
| | 4 | 0.41 | 1.3 | 12.45 | 84.9 | 8.24 | 47.5 | 29.45 | 92.4 | 2.45 | 5.9 | 0.18 | 0.3 |
| | 5 | 0.29 | 0.4 | 13.61 | 85.7 | 8.27 | 44.5 | 21.25 | 90.2 | 2.32 | 9.5 | 0.31 | 0.9 |
| | 6 | 0.43 | 0.9 | 15.24 | 83.1 | 9.64 | 51.8 | 24.03 | 87.9 | 2.57 | 3.6 | 0.47 | 1 |

As shown in Table 3 and FIGS. 1 and 2, it can be seen that specimens prepared using terpolymer resin exhibit improved chemical resistance as compared to specimens prepared using other polymer resins. Particularly, chemical resistance against chemical reagents such as alcohols, oils and detergents improves as compared to specimens prepared using other polymer resins.

Identification of Co-Continuous Phase Structure

Figure 4:
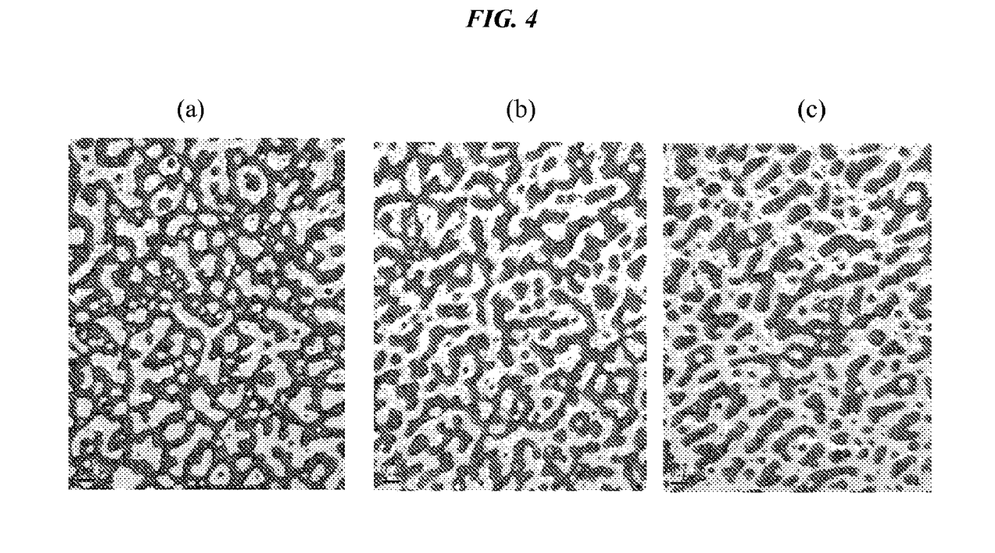
Figure 5:
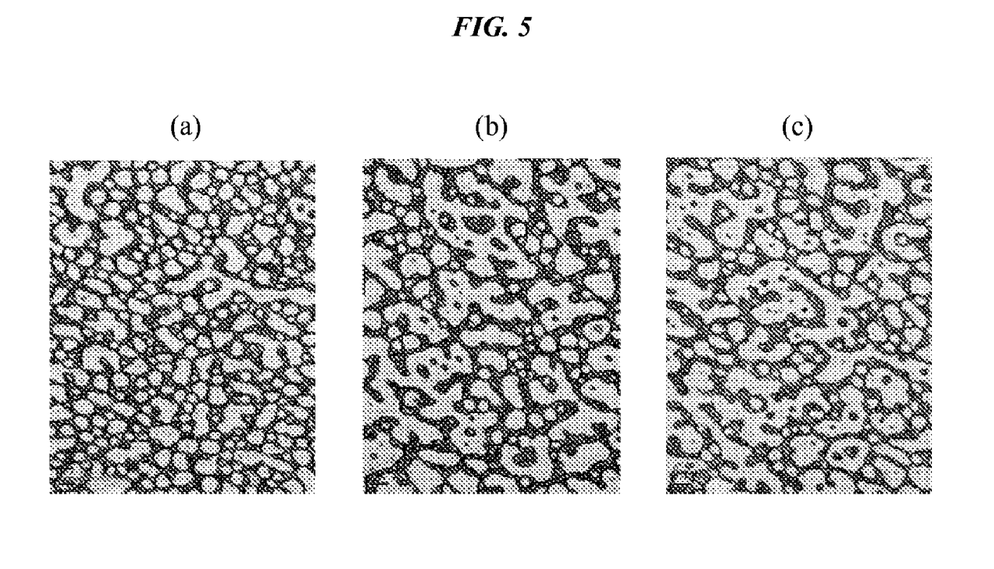

For specimens prepared in Examples 4-6, a co-continuous phase structure is identified by a transmission electron microscope (TEM) with a magnification of 30,000. The TEM surface images of the specimens of Examples 4-6 are shown in FIGS. 4(a), (b), and (c). TEM surface images of the specimens of Comparative Examples 4-6 are shown in FIGS. 5(a), (b), and (c). All of Examples 4-6 and Comparative Examples 4-6 include a rubber phase including an aromatic rubbery block copolymer resin and have co-continuous structures. However, as shown in Tables 2 and 3, resin phases in Comparative Examples 4-6 exhibit markedly deteriorated transparency and chemical resistance, in addition to impact strength and flowability since the terpolymer is not used.

a resin phase including a terpolymer comprising about 50 to about 95% by weight of an aromatic vinyl compound, about 0.1 to about 30% by weight of a vinyl cyanide compound and about 0.1 to about 45% by weight of an unsaturated alkyl ester compound,
wherein said rubber phase and said resin phase have a co-continuous phase structure and wherein the difference between refractive indices of said terpolymer and said aromatic rubbery block copolymer resin is about 0.008 or less.

2. The transparent thermoplastic resin of claim 1, wherein a part of said rubber phase and a part of said resin phase form a discontinuous structure.

3. The transparent thermoplastic resin of claim 1, comprising said rubber phase in an amount of about 20 to about 80% by weight, and said resin phase in an amount of about 20 to about 80% by weight.

4. The transparent thermoplastic resin of claim 1, wherein said terpolymer has weight average molecular weight of about 140,000 to about 350,000.

5. The transparent thermoplastic resin of claim 1, wherein:

said aromatic vinyl compound includes styrene, C1-C8 alkyl substituted styrene, vinyl naphthalene, vinyl toluene or a combination thereof; said vinyl cyanide compound includes acrylonitrile, methacrylonitrile, ethacrylonitrile, or a combination thereof; and said unsaturated alkyl ester compound includes C1-C12 alkyl substituted (meth)acrylate or a combination thereof.

6. The transparent thermoplastic resin of claim 1, wherein said rubbery polymer is a diene-based rubber.

7. The transparent thermoplastic resin of claim 1, further comprising an additive selected from the group consisting of flame retardants, antibiotic agents, releasing agents, thermal stabilizers, antioxidants, light stabilizers, compatibilizers, dyes, inorganic fillers, surfactants, nucleating agents, coupling agents, fillers, plasticizers, impact modifiers, admixing agents, coloring agents, stabilizers, lubricants, antistatic agents, pigments, flameproof agents, and combinations thereof.

8. A method for preparing a transparent thermoplastic resin, the method comprising:
  preparing an aromatic rubbery block copolymer resin comprising about 10 to about 50% by weight of a rubbery polymer and about 50 to about 90% by weight of an aromatic vinyl compound;
  preparing an aromatic vinyl-vinyl cyanide-unsaturated alkyl ester terpolymer having a weight average molecular weight of from about 140,000 to about 350,000 by polymerizing about 50 to about 95% by weight of an aromatic vinyl compound, about 0.1 to about 30% by weight of a vinyl cyanide compound and about 0.1 to about 45% by weight of an unsaturated alkyl ester compound to have a refractive index difference between the terpolymer and the aromatic rubbery block copolymer resin of about 0.008 or less; and
  mixing and melt-extruding the aromatic rubbery block copolymer resin and the aromatic vinyl-vinyl cyanide-unsaturated alkyl ester terpolymer to prepare a transparent thermoplastic resin comprising a rubber phase comprising said aromatic rubbery block copolymer resin and a resin phase comprising said terpolymer, wherein said rubber phase and said resin phase have a co-continuous phase structure and wherein the difference between refractive indices of said terpolymer and said aromatic rubbery block copolymer resin is about 0.008 or less.

9. The method of claim 8, comprising mixing and melt extruding about 20 to about 80% by weight of said aromatic rubbery block copolymer and about 20 to about 80% by weight of said aromatic vinyl-vinyl cyanide-unsaturated alkyl ester terpolymer.

* * * * *